| (12) | United States Patent | (10) Patent No.: | US 9,189,147 B2 |
|---|---|---|---|
| | Asmi et al. | (45) Date of Patent: | Nov. 17, 2015 |

(54) INK LAG COMPENSATION TECHNIQUES

(75) Inventors: Yasser Asmi, Redmond, WA (US); Scott R. Marison, Honolulu, HI (US); Mohsen Agsen, Honolulu, HI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 614 days.

(21) Appl. No.: 12/820,583

(22) Filed: Jun. 22, 2010

(65) Prior Publication Data

US 2011/0310118 A1 Dec. 22, 2011

(51) Int. Cl.

| G06T 11/60 | (2006.01) |
|---|---|
| G06F 3/0488 | (2013.01) |
| G09G 5/08 | (2006.01) |
| G09G 5/24 | (2006.01) |
| G06T 11/20 | (2006.01) |
| G06F 3/14 | (2006.01) |
| G09G 3/20 | (2006.01) |

(52) U.S. Cl.
CPC .............. *G06F 3/04883* (2013.01); *G09G 5/08* (2013.01); *G06F 3/14* (2013.01); *G06T 11/203* (2013.01); *G09G 3/20* (2013.01); *G09G 5/24* (2013.01); *G09G 2320/0252* (2013.01)

(58) Field of Classification Search
CPC ................................. G06T 11/203; G09G 5/24
USPC ........... 345/167–169, 467–469; 382/185–186
See application file for complete search history.

(56) References Cited

U.S. PATENT DOCUMENTS

| 5,995,081 | A | * | 11/1999 | Kato | .............................. | 345/156 |
|---|---|---|---|---|---|---|
| 2002/0141643 | A1 | * | 10/2002 | Jaeger | ........................... | 382/181 |
| 2004/0174365 | A1 | * | 9/2004 | Bub | ............................... | 345/473 |
| 2006/0062461 | A1 | * | 3/2006 | Longe et al. | ................... | 382/185 |
| 2006/0136813 | A1 | * | 6/2006 | Hong et al. | .................... | 715/512 |
| 2006/0146028 | A1 | * | 7/2006 | Chang et al. | .................. | 345/169 |
| 2006/0250393 | A1 | * | 11/2006 | Tsang et al. | ................... | 345/420 |
| 2007/0205978 | A1 | * | 9/2007 | Zhou et al. | ..................... | 345/107 |
| 2008/0056578 | A1 | * | 3/2008 | Shilman et al. | ............... | 382/186 |
| 2008/0192068 | A1 | * | 8/2008 | Refai et al. | ..................... | 345/619 |
| 2008/0260252 | A1 | * | 10/2008 | Borgaonkar et al. | ......... | 382/189 |
| 2009/0324082 | A1 | * | 12/2009 | Liu et al. | ........................ | 382/185 |
| 2010/0277505 | A1 | * | 11/2010 | Ludden et al. | ................ | 345/634 |

FOREIGN PATENT DOCUMENTS

| CN | 1795453 | 6/2006 |
|---|---|---|
| CN | 101276249 | 10/2008 |

OTHER PUBLICATIONS

A. Henzen, et al., "Sketching with a Low-latency Electronic Ink Drawing Tablet," Proceedings of the 3rd International Conference on Computer Graphics and Interactive Techniques in Australasia and South East Asia, XP00241912, Dunedin, New Zealand, pp. 51-60, 2005.*

(Continued)

*Primary Examiner* — Jin-Cheng Wang
(74) *Attorney, Agent, or Firm* — Jeremy Snodgrass; Judy Yee; Micky Minhas (57) ABSTRACT

Ink lag compensation techniques are described. In implementations, an input is recognized by a computing device as an ink stroke to be rendered on a display device of the computing device. An extension is predicted, by the computing device, to be applied to the ink stroke that is likely to be subsequently input in conjunction with the ink stroke. The ink stroke and the extension are output for concurrent display on the display device of the computing device.

20 Claims, 9 Drawing Sheets

(56) References Cited

OTHER PUBLICATIONS

A. Henzen et al., "An electronic ink low latency drawing tablet," Society of Information Display (SID): digest of technical papers XXXV, 1070-1073, 2004.*

"Foreign Office Action", *Chinese Application* No. 201110185129.0, (Oct. 31, 2012), 10 pages.

"Foreign Office Action", Chinese Application No. 201110185129.0, Oct. 25, 2013, 6 pages.

"Foreign Office Action", CN Application No. 201110185129.0, Aug. 4, 2014, 10 Pages.

"Foreign Office Action", CN Application No. 201110185129.0, Mar. 24, 2014, 11 Pages.

* cited by examiner

INK LAG COMPENSATION TECHNIQUES

BACKGROUND

The way in which users are able to interact with computing device is ever increasing. For example, keyboards were originally provided so that a user could type inputs to a computer. Cursor control devices (e.g., a "mouse") were subsequently developed to enable users to interact with the computing device via a graphical user interface.

However, these and subsequent techniques that were developed for user interaction may still have an artificial "look and feel" to the user. For example, traditional techniques that were utilized to render ink strokes by a computing device may encounter an amount of lag between receiving an input (e.g., the drawing of a line) and a display of the input (e.g., the line). Therefore, the user may have a disconnected experience when drawing a line using traditional ink rendering techniques, which may make it difficult for the user to interact with the computing device in this manner.

SUMMARY

Ink lag compensation techniques are described. In implementations, an input is recognized by a computing device as an ink stroke to be rendered on a display device of the computing device. An extension is predicted, by the computing device, to be applied to the ink stroke that is likely to be subsequently input in conjunction with the ink stroke. The ink stroke and the extension are output for concurrent display on the display device of the computing device.

In implementations, frame latency for display of frames by a display device of a computing device is set to a single frame of latency. An input is recognized by the computing device as an ink stroke to be rendered on the display device. The ink stroke is rendered for display on the display device of the computing device using the set frame latency.

In implementations, a computing device includes a housing, a display device disposed on the housing, and one or more modules disposed within the housing. The one or more modules are configured to cause operations to be performed including recognizing an input by a computing device as an ink stroke provided in conjunction with movement of a stylus across the display device to be rendered by the display device, predicting an extension, by the computing device, to be applied to the ink stroke, and displaying the ink stroke and the predicted extension on the display device of the computing device, determining that a subsequent input to continue the ink stroke does not correspond to the predicted extension, and replacing the predicted extension with the continuation of the ink stroke described by the subsequent input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditional techniques that were utilized to render ink strokes by a computing device may fail to truly mimic a look and feel of traditional pen and paper. For example, traditional techniques that were used to draw ink strokes on a display device may encounter a significant lag between receipt of an input describing the ink stroke and display of the ink stroke. Therefore, the user's interaction with the computing device may seem disconnected, which may lead to user frustration.

Ink lag compensation techniques are described. In implementations, techniques are employed to reduce an amount of lag in rendering an ink stroke. For example, predictive techniques may be employed to predict a continuation to an ink stroke based on an input describing the ink stroke. This continuation may then be rendered with the described ink stroke from the input to reduce a perceived amount of lag in the display of the ink stroke. Further, if the predicted continuation does not match a subsequent input describing the ink stroke, the prediction may be removed and replaced with the subsequent input. A variety of other examples are also contemplated, such as to reduce lag through reduction in frame latency of the computing device. Further discussion of these examples may be found in relation to the following sections.

In the following discussion, an example environment is first described that is operable to employ the ink lag compensation techniques described herein. Example illustrations of the techniques and procedures are then described, which may be employed in the example environment as well as in other environments. Accordingly, the example environment is not limited to performing the example techniques and procedures. Likewise, the example techniques and procedures are not limited to implementation in the example environment.

Example Environment

Figure 1:
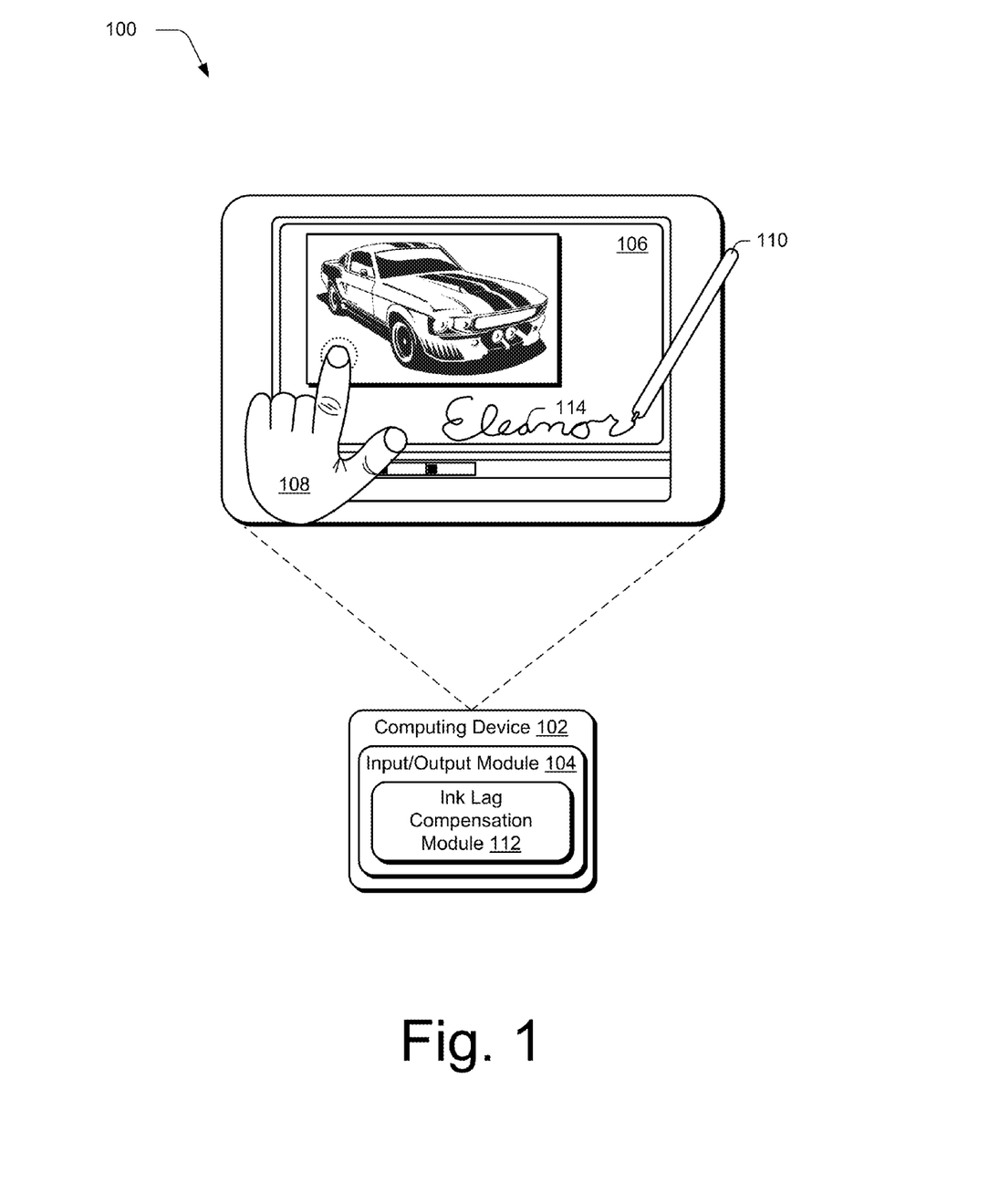
FIG. 1 is an illustration of an environment in an example implementation that is operable to employ ink lag compensation techniques described herein.

FIG. 1 is an illustration of an environment 100 in an example implementation that is operable to employ ink lag compensation techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is illustrated as including an input/output module 104 disposed within a housing of the computing device 102. The input/output module 104 is representative of functionality relating to inputs and outputs of the computing device 102. For example, the input/output module 104 may be configured to receive inputs from a keyboard, mouse, to identify gestures and cause operations to be performed that correspond to the gestures, and so on. The inputs may be identified by the input/output module 104 in a variety of different ways.

For example, the input/output module 104 may be configured to recognize an input received via touchscreen functionality of a display device 106 disposed on a housing of the computing device 102, such as a finger of a user's hand 108 as proximal to the display device 106 of the computing device 102, from a stylus 110, and so on. The input may take a variety of different forms, such as to recognize movement of the stylus 110 and/or a finger of the user's hand 108 across the display device 106, such as a tap, drawing of a line, and so on. In implementations, these inputs may be recognized as gestures.

Although the following discussion may describe specific examples of inputs, in instances the types of inputs may be switched (e.g., touch may be used to replace stylus and vice versa) and even removed (e.g., both inputs may be provided using touch or a stylus) without departing from the spirit and scope thereof. Further, although in instances in the following discussion the gestures are illustrated as being input using touchscreen functionality, the gestures may be input using a variety of different techniques by a variety of different devices, such as through detection by a camera as part of a natural user interface (NUI).

The computing device 102 is further illustrated as including an ink lag compensation module 112 that is representative of functionality to apply a variety of different techniques to render an ink stroke 114, e.g., for display on the display device 106 of the computing device 102, with reduced lag. For example, the ink lag compensation module 112 may utilize techniques to predict a future part of an ink stroke based on an input describing the ink stroke. This future part may then be displayed with the ink stroke as an extension of the ink stroke even before an input is received that describes this extension. Therefore, the extension may be provided to reduce perceived lag in the rendering of the ink stroke by the computing device. Further discussion of predictive ink lag compensation techniques may be found in relation to FIGS. 3-7.

The ink lag compensation module 112 may also employ techniques to reduce lag by reducing frame latency employed by the computing device 102. For example, modules of the computing device 102 (e.g., an operating system) may set frame latency to a value that may introduce additional amounts of lag. By reducing this value (e.g., by setting frame latency to a lower value and thus lower latency), the computing device 102 may render the ink stroke faster and thus reduce the lag encountered in rendering the input. Further discussion of frame latency lag compensation techniques may be found in relation to FIG. 8.

Figure 2:
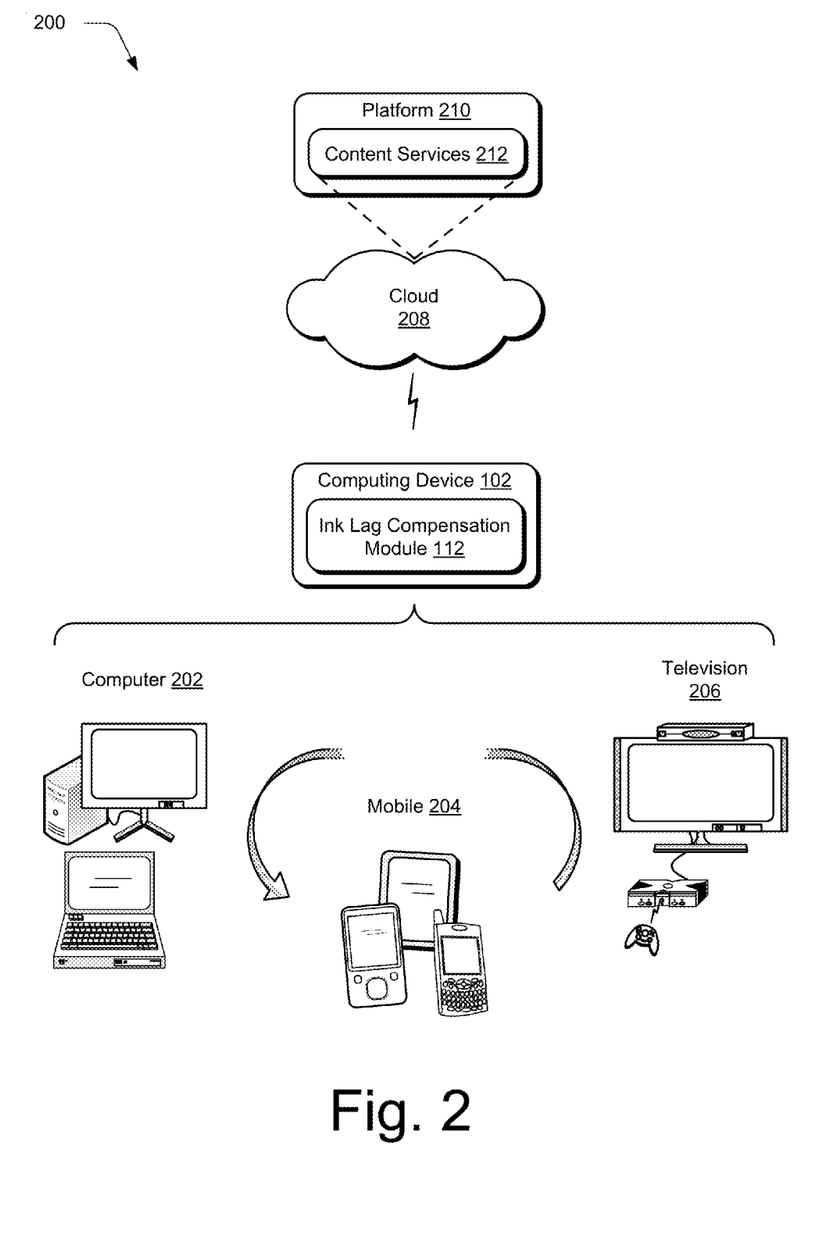
FIG. 2 is an illustration of an example system showing an ink lag compensation module of FIG. 1 as being implemented using in an environment where multiple devices are interconnected through a central computing device.

FIG. 2 illustrates an example system 200 that includes the computing device 102 as described with reference to FIG. 1. The example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the client device 102 may assume a variety of different configurations, such as for computer 202, mobile 204, and television 206 uses. Each of these configurations includes devices that may have generally different constructs and capabilities, and thus the computing device 102 may be configured according to one or more of the different device classes. For instance, the computing device 102 may be implemented as the computer 202 class of a device that includes a personal computer, desktop computer, a multi-screen computer, laptop computer, netbook, and so on.

The computing device 102 may also be implemented as the mobile 202 class of device that includes mobile devices, such as a mobile phone, portable music player, portable gaming device, a tablet computer, a multi-screen computer, and so on. The computing device 102 may also be implemented as the television 206 class of device that includes devices having or connected to generally larger screens in casual viewing environments. These devices include televisions, set-top boxes, gaming consoles, and so on. The ink lag compensation techniques described herein may be supported by these various configurations of the client device 102 and are not limited to the specific examples of ink lag compensation techniques described herein.

The cloud 208 includes and/or is representative of a platform 210 for content services 212. The platform 210 abstracts underlying functionality of hardware (e.g., servers) and software resources of the cloud 208. The content services 212 may include applications and/or data that can be utilized while computer processing is executed on servers that are remote from the client device 102. Content services 212 can be provided as a service over the Internet and/or through a subscriber network, such as a cellular or Wi-Fi network.

The platform 210 may abstract resources and functions to connect the computing device 102 with other computing devices. The platform 210 may also serve to abstract scaling of resources to provide a corresponding level of scale to encountered demand for the content services 212 that are implemented via the platform 210. Accordingly, in an interconnected device embodiment, implementation of functionality of the ink lag compensation module 112 may be distributed throughout the system 200. For example, the ink lag compensation module 112 may be implemented in part on the computing device 102 as well as via the platform 210 that abstracts the functionality of the cloud 208.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the ink lag compensation techniques described below are platform-independent, meaning that the techniques may be implemented on a variety of commercial computing platforms having a variety of processors.

Implementation Examples

Figure 3:
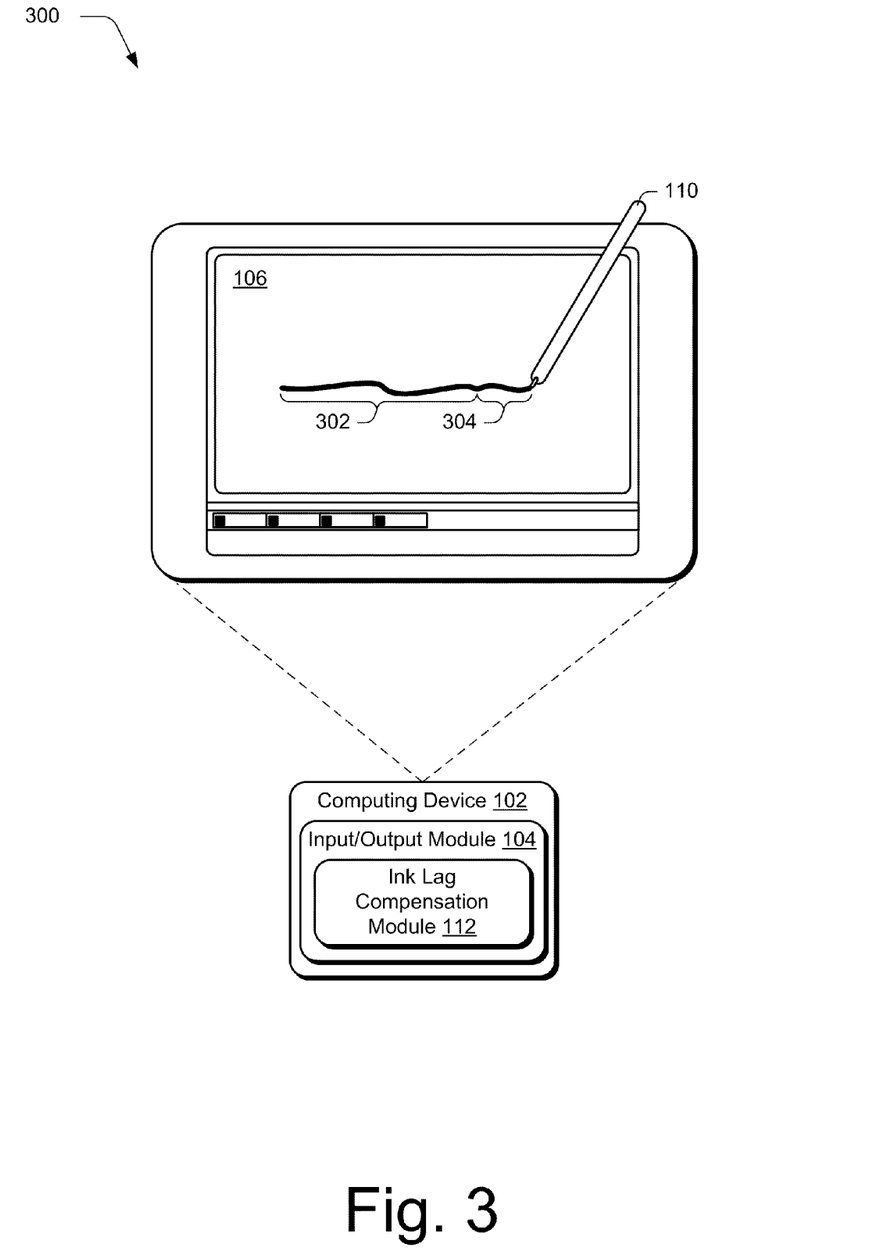
FIG. 3 depicts a system in an example implementation in which a predictive ink lag compensation technique is employed to an ink stroke input as a line.

FIG. 3 depicts a system 300 in an example implementation in which a predictive ink lag compensation technique is employed to an ink stroke input as a line. In this example, an input is received that describes an ink stroke 302 to be rendered on the display device of the computing device 102. The input 302 is illustrated as being provided using a stylus 110 although other examples are also contemplated, such as a finger of the user's hand 108.

As shown, an end of the ink stroke 302 may be positioned at a significant distance away from the stylus 110 on the display device 106 when rendered by the display device 106. Accordingly, the ink lag compensation module 112 in this example predicts an extension 304 to be applied to and rendered with the ink stroke 302 described by the input. In this way, the predicted extension 304 may be displayed before an input is received which describes an actual continuation of the ink stroke 302.

The extension 304 may be predicted by the ink lag compensation module 112 in a variety of ways. For example, the ink lag compensation module 112 may recognize the input that describes the ink stroke 302 as well as a speed at which the ink stroke 302 was input. The ink lag compensation module 112 may then predict an extension 304 to have a length that would be drawn in an amount of expected lag by the computing device 102. In this way, the ink lag compensation module 112 may reduce and even eliminate perceived lag of the computing device 102 in detecting and rendering an input, e.g., the ink stroke. In this example, the extension 304 was predicted at least in part based on a general direction exhibited by the input that describes the ink stroke 302. A variety of other techniques may also be employed, such as to employ heuristics, an example of which may be found in relation to the following figure.

Figure 4:
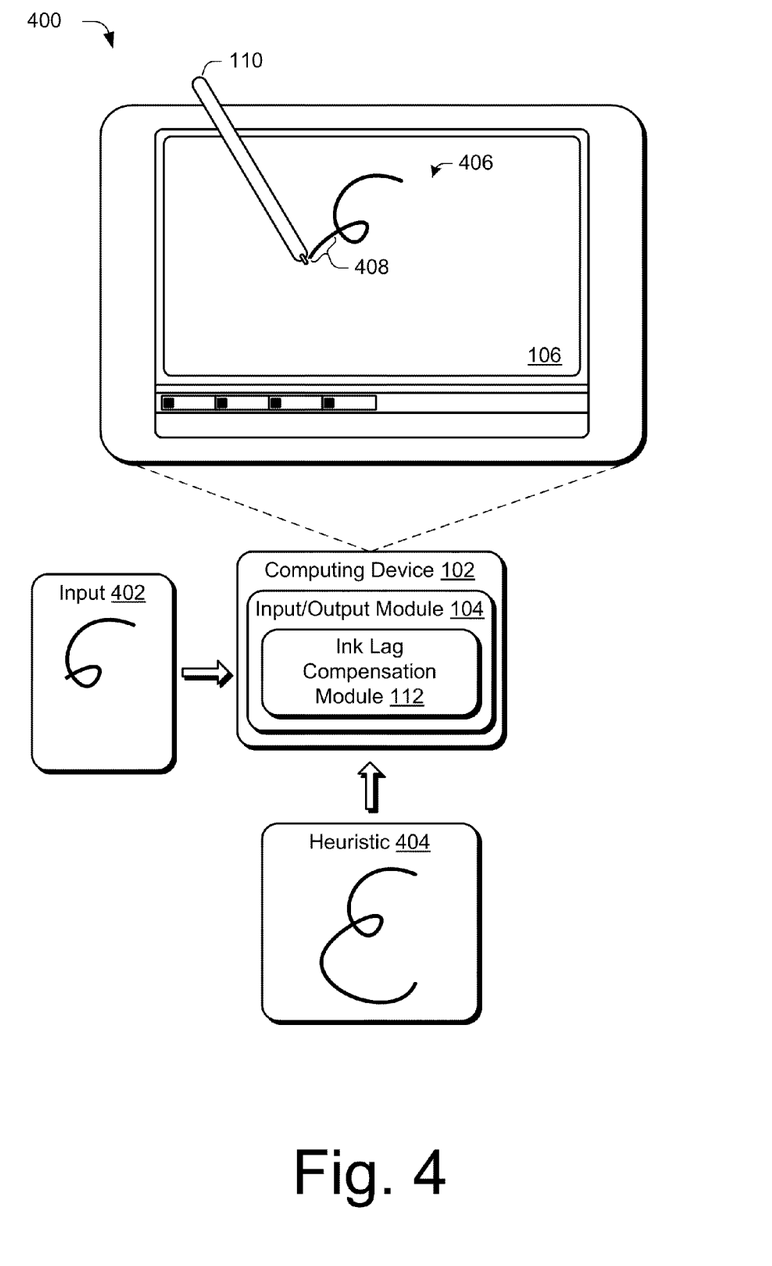
FIG. 4 depicts a system in an example implementation in which a predictive ink lag compensation technique is employed to an ink stroke input as a portion of a letter.

FIG. 4 depicts a system 400 in an example implementation in which a predictive ink lag compensation technique is employed to an ink stroke input as a portion of a letter. In the illustrated system 400, an input 402 is received by the ink lag compensation module 112 that describes an ink stroke, which in this instance is a portion of a letter "E."

The ink lag compensation module 112 is also illustrated as employing a heuristic 404 to determine a likely result of the input 402, which is illustrated as the letter "E" in this example. Accordingly, the ink lag compensation module 112 may cause the input 402 to be rendered on the display device 106 as ink stroke 406 along with an extension 408 that is computed using the heuristic 404.

The heuristic 404 may be obtained in a variety of ways. For example, the heuristic 404 may be stored based on monitored interaction of users (and even particular users) with the computing device 102. The heuristic 404 may also be preconfigured to describe likely outcomes that are not based on users of the particular computing device 102, e.g., stored by a manufacturer of the computing device, a coder of the ink lag compensation module 112, and so on.

As before, the extension 408 may have a length that corresponds to an expected amount of lag. Therefore, the extension 408 in this example may be used to at least partially "close the gap" in rendering of input 402 as an ink stroke 406 by the display device. Although in this example the extension was formed to complete at least the drawing of a letter, the heuristics may also be employed in a variety of other ways, an example of which is described in relation to the following figure.

Figure 5:
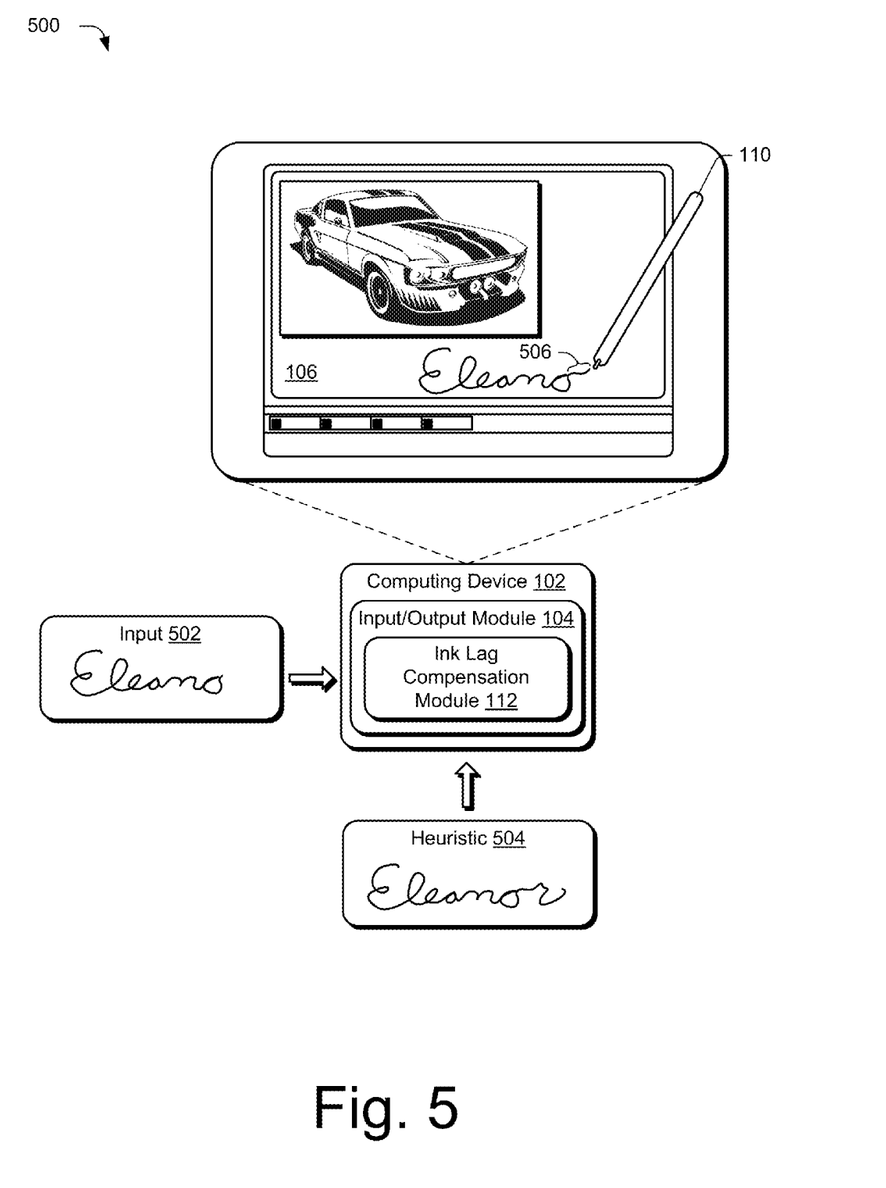
FIG. 5 depicts a system in an example implementation in which a predictive ink lag compensation technique is employed to an ink stroke input as a portion of a word.

FIG. 5 depicts a system 500 in an example implementation in which a predictive ink lag compensation technique is employed to an ink stroke input as a portion of a word. In the illustrated system 500, an input 502 is received by the ink lag compensation module 112 that describes an ink stroke. In this example, the input 502 describes a collection of letters, e.g., "Eleano."

The ink log compensation module 112 in this example leverages a heuristic 504 that is chosen by the ink lag compensation module 112 for a word that is likely to be intended by the input 504, which is illustrated as "Eleanor" in this example. Accordingly, the ink lag compensation module 112 may predict an extension 506 in this instance that includes at least part in another letter in the word based on previous letters in the word. As before, the extension 506 may be based at least in part on a speed of the input, e.g., how fast the letters "Eleano" of the input 502 were drawn using the stylus 110. Although alphabetic characters have been described in relation to FIGS. 4 and 5, it should be readily apparent that a wide variety of other characters (e.g., non-alphabetic characters) and other objects may also be utilized to predict the extension.

Figure 6:
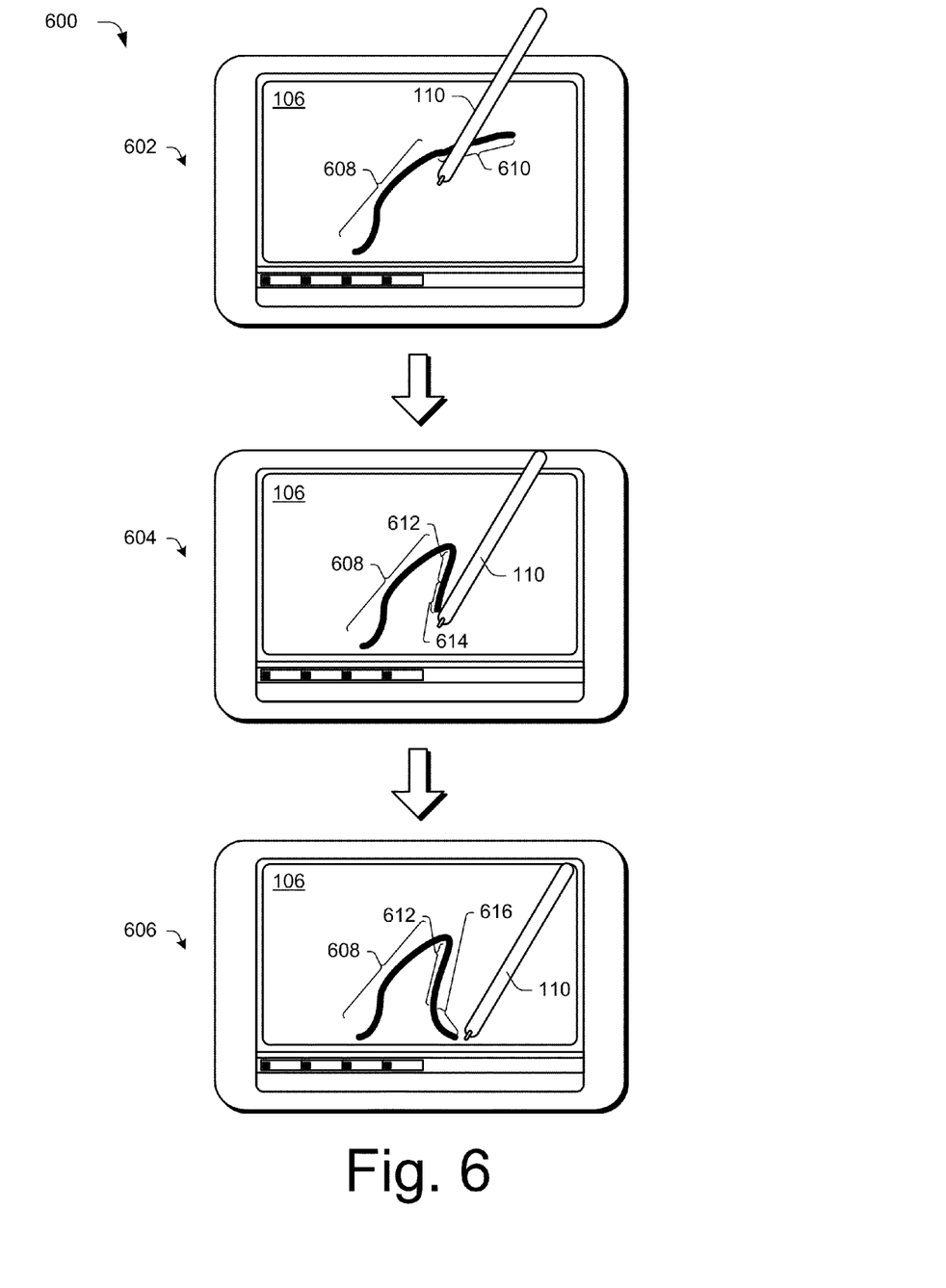
FIG. 6 depicts a system in an example implementation in which a predicted extension is replaced with an ink stroke described in a subsequent input received by the computing device of FIG. 1.

FIG. 6 depicts a system 600 in an example implementation in which a predicted extension is replaced with an ink stroke described in a subsequent input received by the computing device 102 of FIG. 1. The system 600 is illustrated through the use of first, second, and third stages 602, 604, 606. At the first stage 602 an input is shown as rendered as an ink stroke 608. An extension 610 that was predicted for the input is also rendered by the display device 106.

As shown by the positioning of the stylus 110 in the first stage 602, however, the extension 610 does not correspond to a subsequent position of the stylus 110. Accordingly, in the second stage 604 the extension is replaced with an ink stroke 612 that is described in the subsequent input. In this way, the ink lag compensation module 112 may adjust the predicted extension to "line up" with actual inputs. The ink lag compensation module 112 may further predict an extension 614 based on the subsequent input 612 as well as previously inputs, e.g., the portion of the ink stroke 608 rendered initially in the first stage 602. This process may continue as illustrated by the third stage 606 to render additional inputs and predicted extensions for the ink stroke, which is made up of ink strokes 608, 612, and 616. Thus, the ink lag compensation module 112 may predict and correct predicted extensions to reduce perceived lag of the computing device 102 to render inputs, further discussion of which may be found in relation to the following procedures.

Example Procedures

The following discussion describes ink lag compensation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-600 of FIGS. 2-6.

Figure 7:
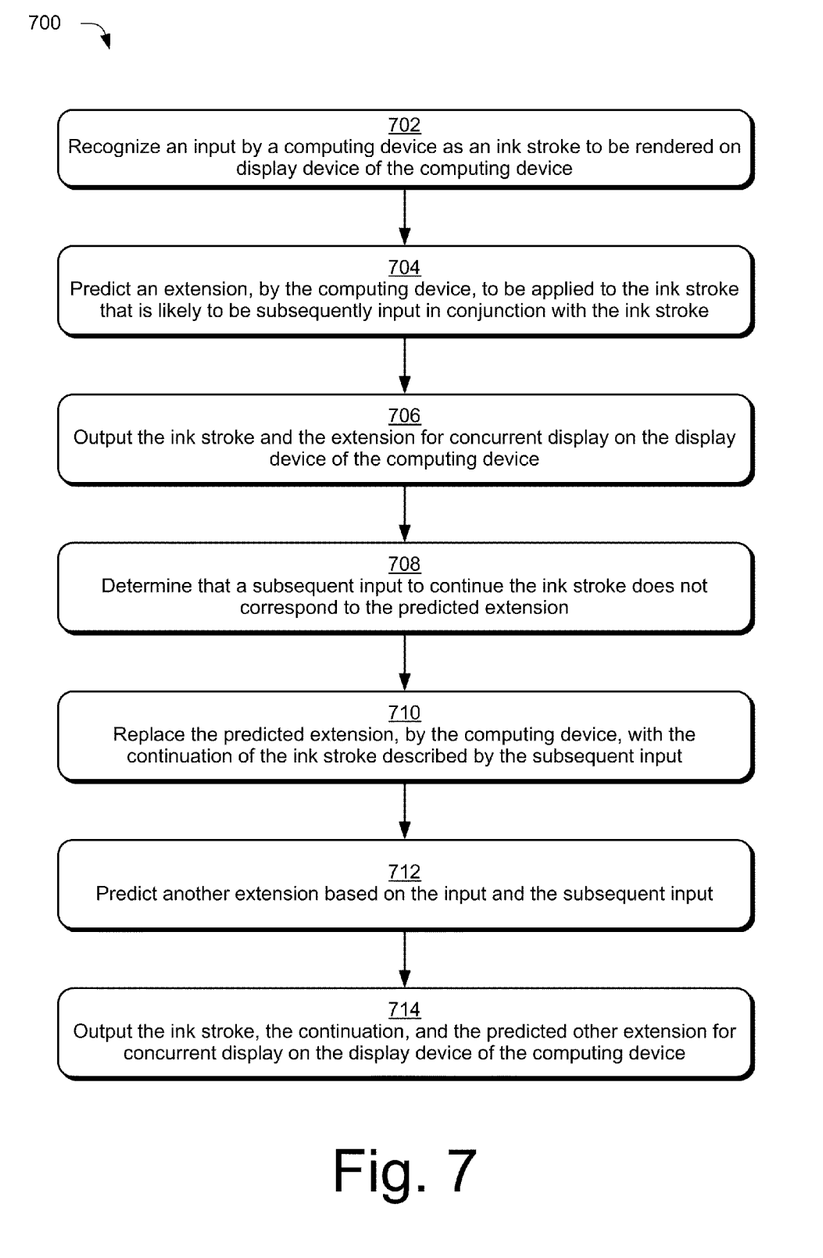
FIG. 7 is a flow diagram depicting a procedure in an example implementation in which predictive ink lag compensation techniques are employed to reduce lag in rendering of an ink stroke by a computing device.

FIG. 7 depicts a procedure 700 in an example implementation in which predictive ink lag compensation techniques are employed to reduce lag in rendering of an ink stroke by a computing device. An input is recognized by a computing device as an ink stroke to be rendered on a display device of the computing device (block 702). For example, the input may be detected using touchscreen functionality of the computing device 102 to detect movement of a finger of a user's hand 108, a stylus 110, and so on. Other examples are also contemplated, such as to detect movement using a camera as part of a natural user interface (NUI).

An extension is predicted, by the computing device, to be applied to the ink stroke that is likely to be subsequently input in conjunction with the ink stroke (block 704). For example, an extension may be predicted based on a likely direction of the stylus 110 in drawing a line, using heuristic techniques to determine a likely result of the input (e.g., a character or other object), and so on. As previously described, a length of the extension may be based at least in part on a speed of the input.

The ink stroke and the extension are output for concurrent display on the display device of the computing device (block 706). For example, the display device 106 may display the ink stroke 608 and the extension 610.

A determination is made that a subsequent input to continue the ink stroke does not correspond to the predicted extension (block 708). As shown in FIG. 6, for instance, the stylus 110 is illustrated as going down rather than to the right as predicted by the ink lag compensation module 112.

The predicted extension is replaced, by the computing device, with the continuation of the ink stroke described by the subsequent input (block 710). Continuing with the previous example, the extension 610 may be replaced with an ink stroke 612 that corresponds to the subsequent input. Another extension is also predicted based on the input and the subsequent input (block 712). The other extension 614 that was predicted may be rendered with the ink stroke 612 to again reduce perceived lag.

Accordingly, the ink stroke, the continuation, and the predicted other extension are output for concurrent display on the display device of the computing device (block 714). This procedure 700 may continue for additional ink stroke to again reduce and even remove lag perceived by a user in the rendering of an input by the display device 106 of the computing device 102. Other techniques may also be employed to reduce perceived lag, an example of which may be found in relation to the following figure.

Figure 8:
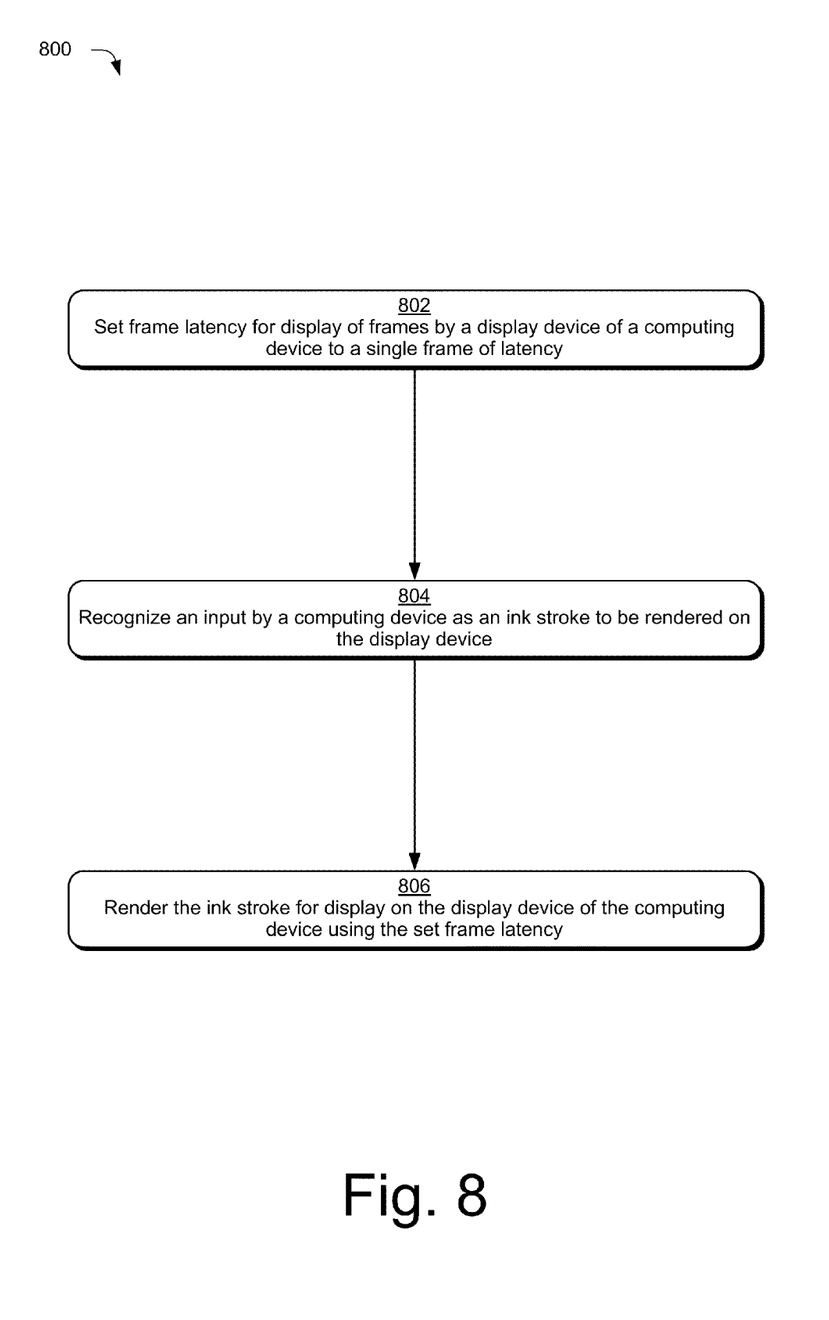
FIG. 8 is a flow diagram depicting a procedure in an example implementation in which ink lag compensation techniques employ setting frame latency of a computing device to reduce lag.

FIG. 8 depicts a procedure 800 in an example implementation in which ink lag compensation techniques employ setting frame latency of a computing device to reduce lag. In some instances, other modules of the computing device 102 (e.g., an operating system, display device driver, and so on) may set a frame latency for the display device 106. Accordingly, this frame latency may introduce additional perceived lag in the rendering of an ink stroke and other elements by the display device 106.

Accordingly, in an implementation frame latency for display of frames by a display device of a computing device is set to a single frame of latency (block 802). For example, the ink lag compensation module 112 may assume control of the display device 106 using a full screen exclusive mode and set the frame latency to one on a scale of one of twenty frames of latency. Therefore, at a sixty frames per second rate, perceived lag may be reduced by about thirty three milliseconds. Therefore, for an input recognized by the computing device as a ink stroke to be rendered on the display device (804), the ink stroke is rendered for display on the display device of the computing device using the set frame latency (block 806). In this way, the perceived lag may at least partially "catch up" in comparison with traditional frame latency rates of three or more that are typically employed by operating systems and so on.

Example Device

Figure 9:
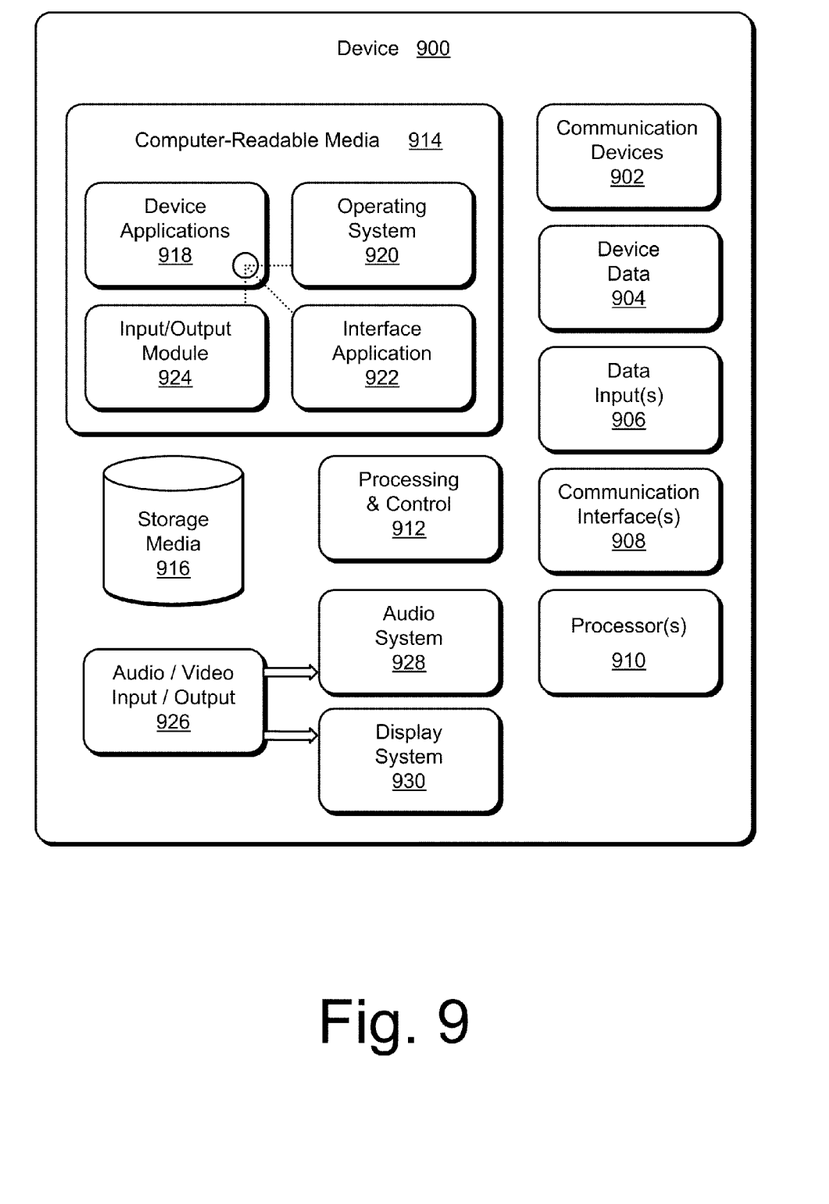
FIG. 9 illustrates various components of an example device that can be implemented as any type of portable and/or computer device as described with reference to FIGS. 1-6 to implement embodiments of the ink rendering techniques described herein.

FIG. 9 illustrates various components of an example device 900 that can be implemented as any type of portable and/or computer device as described with reference to FIGS. 1 and 2 to implement embodiments of the gesture techniques described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more o\f a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable instructions to control the operation of device 900 and to implement embodiments of a touch pull-in gesture. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.). The device applications 918 also include any system components or modules to implement embodiments of the gesture techniques described herein. In this example, the device applications 918 include an interface application 922 and an input/output module 924 (which may be the same or different as input module 114) that are shown as software modules and/or computer applications. The input/output module 924 is representative of software that is used to provide an interface with a device configured to capture inputs, such as a touchscreen, track pad, camera, and so on. Alternatively or in addition, the interface application 922 and the input/output module 924 can be implemented as hardware, software, firmware, or any combination thereof. Additionally, the input/output module 924 may be configured to support multiple input devices, such as separate devices to capture touch and stylus inputs, respectively. For example, the device may be configured to include dual display devices, in which one of the display device is configured to capture touch inputs while the other stylus inputs.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   recognizing an input by a computing device as a free-style hand-written ink stroke to be rendered on a display device of the computing device;
   predicting, by the computing device, an extension of the free-style hand-written ink stroke based on one or more heuristics as determined from monitored interactions of a user of the computing device and previous inputs recognized by the computing device, the extension of the free-style hand-written ink stroke predicted to be extended from the free-style hand-written ink stroke that is likely to be subsequently input in conjunction with the input of the free-style hand-written ink stroke; and
   outputting the ink stroke and the extension for concurrent display on the display device of the computing device, the extension displayed as a continuation of the free-style hand-written ink stroke to compensate for a lag in displaying the free-style hand-written ink stroke on the display device.

2. The method as described in claim 1, wherein a length of the extension is calculated to compensate for the lag in a display of the free-style hand-written ink stroke on the display device by the computing device.

3. The method as described in claim 2, wherein the length of the extension is based at least in part on a speed exhibited in providing the input.

4. The method as described in claim 1, wherein the free-style hand-written ink stroke is input through use of a stylus and detected by the computing device using touchscreen functionality.

5. The method as described in claim 1, wherein the predicting is based on using the one or more heuristics that leverage the previous inputs recognized by the computing device, the one or more heuristics that were preconfigured to describe likely outcomes, or the one or more heuristics that were stored by the manufacturer.

6. The method as described in claim 1, wherein the predicting includes determining that the free-style hand-written ink stroke describes at least a portion of the character and the extension includes at least a part of the character that has yet to be input.

7. The method as described in claim 1, wherein the predicting includes determining that the free-style hand-written ink stroke describes at least a portion of the word and the extension includes at least a part of the word that has yet to be input.

8. The method as described in claim 7, wherein the part of the word includes a portion of a next letter in the word.

9. The method as described in claim 1, wherein the predicting includes determining that the free-style hand-written ink stroke describes at least a portion of a particular object that has been input previously and the extension includes at least a part of the object that has yet to be input.

10. The method as described in claim 1, further comprising:
    determining by the computing device that a subsequent input to continue the free-style hand-written ink stroke does not correspond to the predicted extension; and
    replacing the predicted extension, by the computing device, with the continuation of the free-style hand-written ink stroke described by the subsequent input.

11. The method as described in claim 10, further comprising:
  predicting another extension based on the input and the subsequent input; and
  outputting the free-style hand-written ink stroke, the continuation, and the predicted other extension for concurrent display on the display device of the computing device.

12. A method comprising:
  setting an adjustable frame latency for display of frames by a display device of a computing device to a single frame of latency, the frame latency adjusted for a perceived lag between receiving an input by the computing device and displaying the input by the display device;
  recognizing an input by the computing device as a free-style hand-written ink stroke to be rendered on the display device; and
  rendering the free-style hand-written ink stroke for display on the display device of the computing device using the set frame latency; and
  predicting an extension of the free-style hand-written ink stroke that is likely to be subsequently input in conjunction with the input of the free-style hand-written ink stroke.

13. The method as described in claim 12, wherein the setting includes entering a full screen exclusive mode for control of the display device.

14. The method as described in claim 13, wherein the full screen exclusive mode bypasses operating system control of the frame latency.

15. The method as described in claim 12, wherein the free-style hand-written ink stroke is detected using touchscreen functionality of the computing device.

16. The method as described in claim 12, wherein the free-style hand-written ink stroke is detected via a natural user interface (NUI) using a camera.

17. A computing device comprising:
  a housing;
  a display device disposed on the housing; and
  one or more modules disposed within the housing, the one or more modules configured to cause operations to be performed comprising:
    recognizing an input by a computing device as a free-style hand-written ink stroke provided in conjunction with hand-written movement of a stylus across the display device to be rendered by the display device;
    predicting an extension of the free-style hand-written ink stroke based in part on one or more heuristics and a speed of the input as determined by the one or more modules, the extension of the free-style hand-written ink stroke predicted to be extended from the free-style hand-written ink stroke;
    setting an adjustable frame latency for display of frames by the display device to a single frame of latency, the frame latency adjusted for a perceived lag between recognizing the input and displaying the free-style hand-written ink stroke;
    displaying the free-style hand-written ink stroke and the predicted extension on the display device of the computing device using the set frame latency;
    determining that a subsequent input to continue the free-style hand-written ink stroke does not correspond to the predicted extension; and
    replacing the predicted extension with the continuation of the free-style hand-written ink stroke described by the subsequent input as hand-written.

18. The computing device as described in claim 17, wherein the input and the subsequent input are detectable using touchscreen functionality of the computing device that is implemented using the one or more modules.

19. The computing device as described in claim 17, wherein the modules are further configured to cause operations to be performed comprising:
  predicting another extension based on the input and the subsequent input; and
  displaying the free-style hand-written ink stroke, the continuation, and the predicted other extension for concurrent display on the display device.

20. The computing device as described in claim 17, wherein the predicting includes determining that the free-style hand-written ink stroke describes at least a portion of the character and the extension includes at least a part of the character that has yet to be input.

* * * * *